United States Patent Office

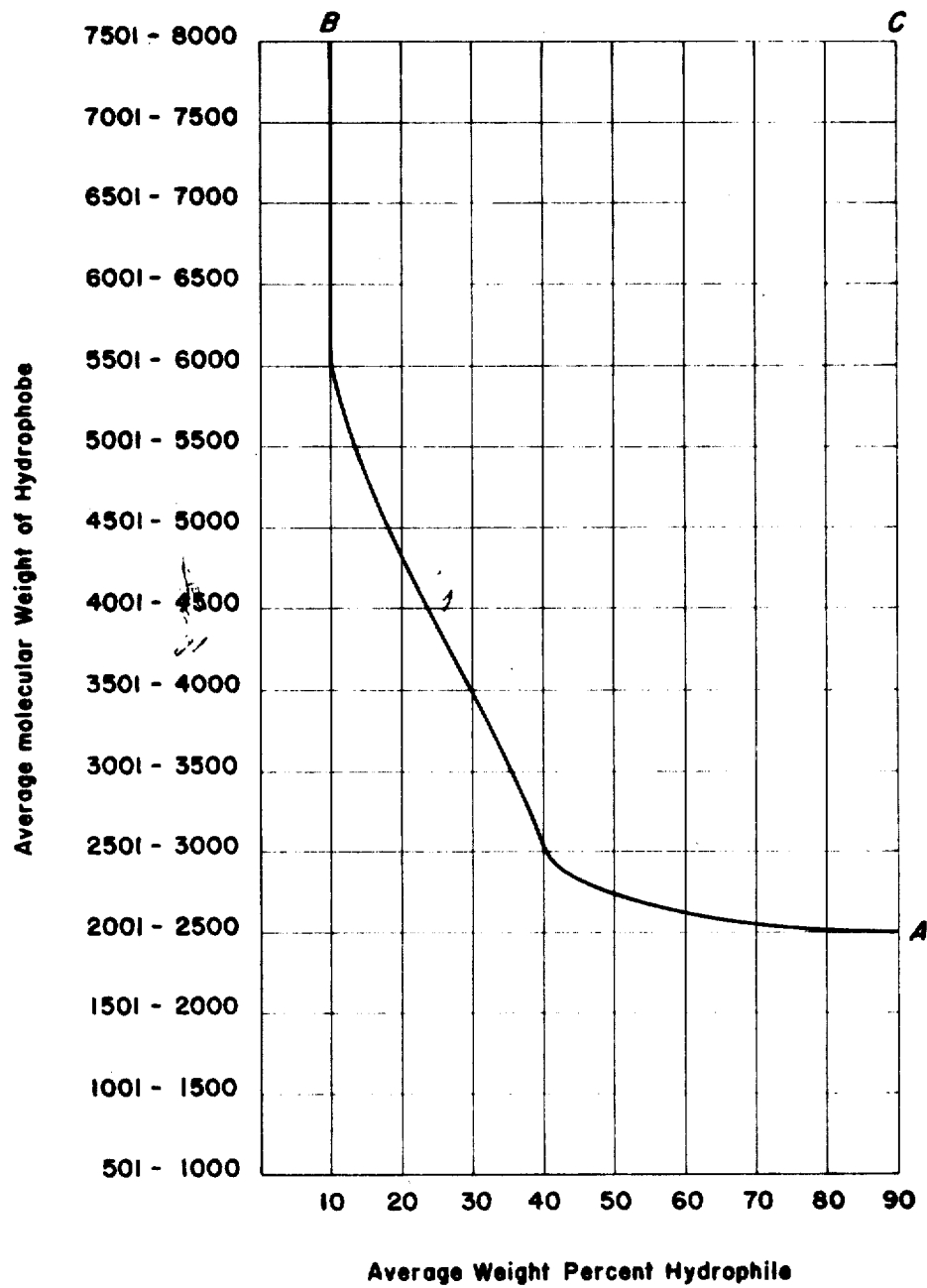

3,579,465
Patented May 18, 1971

3,579,465
AQUEOUS GELS OF POLYOXYETHYLATED POLY-OXYPROPYLENE GLYCOL ADDUCTS OF ETHYLENE DIAMINE
Irving R. Schmolka, Grosse Ile, Mich., assignor to Wyandotte Chemicals Corporation, Wyandotte, Mich.
Filed Oct. 16, 1967, Ser. No. 675,505
Int. Cl. A01n 9/00; A61k 7/00; B01j 13/00
U.S. Cl. 252—316     6 Claims

ABSTRACT OF THE DISCLOSURE

Aqueous gels, useful in the formulation of pharmaceutical, cosmetic and detergent compositions, are prepared from certain polyoxyethylated polyoxypropylene glycol adducts of ethylene diamine.

---

The present invention relates to a series of novel aqueous gels and to the preparation thereof. In another aspect, the invention relates to compositions containing the novel gels and pharmaceutical, cleansing and/or cosmetic ingredients.

The prior art teaches that in order to form gels in formulations containing polyoxyethylene-polyoxypropylene block polymers, it is necessary to include a gelling agent. For example U.S. Pat. 2,773,801 teaches the use of natural and synthetic gums and gum-like materials as gelling agents. British Pat. 786,346 teaches that it is necessary to treat a hydroxyl polymer with a complex condensation product of one mole of a compound of the formula $Ti(OR)_4$, wherein R is an alkyl radical of 1 to 8 carbon atoms with ½ to 4 moles of a saturated $C_2$-$C_8$, aliphatic hydroxy mono-, di-, or tri-carboxylic acid to obtain gelation. It has also been reported by W. Schönfeldt ("Surface Active Addition Products of Ethylene Oxide") that nonyl phenol with 40 or more moles of ethylene oxide added thereto do not form gels in an aqueous solution.

It is an object of this invention to provide a transparent ringing organic polymer gel. Another object is to provide an improved gel for use in cosmetic, pharmaceutical and cleansing formulations. A still further object of this invention is to provide a series of gels that do not become liquid at elevated temperatures. Yet another object of this invention is to prepare an organic gel from ingredients that do not require heating to bring about the formation of the gel. These and other objects of the invention will be apparent from the following disclosure.

It has been discovered that within specific limits aqueous solutions of polyoxyethylated polyoxypropylene glycol adducts of ethylene diamine will form gels. The gels of the present invention comprise from about 20 to 90 weight percent of a polyoxyethylated polyoxypropylene glycol adduct of ethylene diamine and from 80 to 10 weight percent of water. The polyoxyethylated polyoxypropylene glycol adducts of ethylene diamine which may be employed in the preparation of the gels of the present invention may be represented by the following formula:

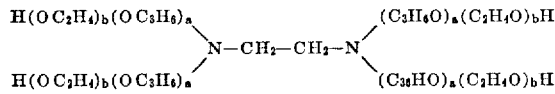

wherein $a$ and $b$ are integers such that the molecular weight of the hydrophobe and the weight percent of the hydrophile fall within the area ABC of the graph shown in the figure. Thus the above polymers may have (1) a hydrophobe molecular weight of from about 2000 to about 8000, (2) a hydrophile content of from 10% to 90% by weight, and (3) a total molecular weight of from about 4000 to 100,000.

It is to be understood that by the term "hydrophobe" is meant the polyoxypropylene glycol adducts of ethylene diamine. As used herein, the term "gel" is defined as a solid or semisolid colloid containing considerable quantities of liquid. The particles in a gel are linked in a coherent meshwork which immobilizes the liquid. A colloidal solution with water as the dispersion medium is called, more specifically, a "hydrosol." The gels within the scope of the present invention are more specifically "ringing" gels and may be described as gels that have a firm jelly-like consistency; that is, by tapping the gel lightly it will vibrate and return to its original configuration.

The gels of the instant invention have many potential uses in cosmetic, pharmaceutical and detergent applications. These ringing gels are compatible with most of the known ingredients used in cosmetic, pharmaceutical and detergent formulation. For example, the gels of this invention may be compounded with deodorants and antiperspirants. Simple deodorants such as oxyquinoline salts and zinc oxide; astringents such as aluminum chlorohydrate; antiseptics such as diisobutylphenoxyethoxyethyldimethyl benzyl ammonium chloride and hexachlorodihydroxydiphenylmethane; and pesticides such as boric acid, hexachlorophene and N,N-diethyltoluamide may be compounded with the aqueous gels of this invention. To those skilled in the cosmetic and pharmaceutical sciences, it will become apparent that these gels may be used in shampoos, in lanoline and oxyethylated lanolin-rich skin creams, and with mineral oil for skin and hair products. Examples shown hereinafter will illustrate typical formulations.

It is an advantage that the gels can be made without the necessity of heating the ingredients. It is another advantage that these ringing gels do not liquefy under the elevated temperatures often encountered during the handling and storage of the finished product. The final product does not deteriorate as a result of the elevated temperatures often encountered in storage. Thus, special handling and storage precautions are not necessary, as is often the case with some of the prior art gel cosmetic and pharmaceutical preparations.

When the gels of this invention are formulated with pharmaceutical or cosmetic ingredients, they may be transparent or opaque. If the active ingredients are water-soluble, the formulation results in a transparent gel. With water-dispersible ingredients, such as mineral oils, lanolin, and lanolin derivatives, the formulated product is opaque. It is also apparent to those skilled in the art that perfumes, preservatives, and color additives may be included in the formulated product.

The hydrophobe base of the polymers of Formula I above is prepared by adding propylene oxide to the four hydroxyl groups of ethylene diamine. To be useful in the present invention, the hydrophobe base must have a molecular weight of at least about 2000, preferably from 4500 to 7000. By adding ethylene oxide to the hydrophobe base, it is possible to put polyoxyethylene hydrophile groups on the ends of the molecule. These hydrophile polyoxyethylene groups may be controlled to constitute anywhere from 10% to 90% by weight of the polymer. A more detailed explanation of the preparation of these block polymers may be found in U.S. Pat. 2,979,528.

Because of the nature of aqueous solutions of the block polymers employed in the present invention, certain critical variables must be recognized in the preparation of gels therefrom. These variables are:

(1) the molecular weight of the hydrophobe base, (2) the weight percent of the hydrophile portion of the polymer, and
(3) the weight percent concentration of block polymer in the gel.

Only those polymers that have a hydrophobe molecular weight and a hydrophile percent weight falling within the area ABC of the graph shown in the figure are useful in the preparation of the ringing gels of the present invention. As demonstrated hereinafter, polymers falling outside of the area do not form gels regardless of the concentration of polymer in the gel.

The gels of the present invention are prepared by dissolving from about 20% to 90%, preferably from about 20% to 50%, by weight of the block polymer, depending upon the molecular weight of the particular hydrophobe base used and the ethylene oxide content, in from about 80% to 10%, preferably from about 80% to 50%, of cold water. The water should be at a temperature below at least 50° F. and preferably between 35° F. and 45° F. The block polymer is thoroughly mixed until it is dissolved in the water. The solution is then allowed to warm to room temperature, whereby a clear ringing gel is formed. As the temperature of the solution rises, it is believed that the hydrophile is partially dehydrated and micellar aggregation increases. It is surmised that formation of larger aggregates by the higher molecular weight hydrophobes entrap additional water as compared to the lower weight hydrophobes, this leading in turn to gel formation as the temperature increases.

The technical explanation for the formation of the gels of the present invention is not entirely understood, and the explanation is not to be considered as being limitative of the invention. However, the behavior of the block polymers in forming the gels is believed to be explained on the basis of hydrate formation. It may be speculated that the hydrophobe, because it is different from the hydrophobe of other types of non-ionics, may, in its own right, immobilize water independently of the oxyethylene chain by hydrogen bonding. It is notewrothy that gel formation occurs at about 70° F. to 80° F., even where the block polymer contains more than 200 moles of ethylene oxide or over 100 moles per block. It is also believed that the nature of the block polymer adds to this phenomena. It should be noted that the block polymer used in the gels of this invention exhibit a hydrophobe lying among four equal hydrophiles, whereas nonionics commonly encountered, such as the oxyethylated fatty alcohols and alkyl phenols, have only one hydrophile. This difference in structure suggests that a loose micellar structure is obtained with this class of nonionics and that gel formation would more readily involve entrapment of free water in addition to water due to hydrogen bonding.

The following examples illustrate the invention. All parts are by weight unless otherwise indicated.

EXAMPLE I

A polyoxyethylated block polymer of Formula I above, having an average molecular weight hydrophobe base of 7000 and a hydrophile constituting about 80% by weight of the polymer, was used in making the gel of this example. Average found molecular weight of the block polymer is about 26,600 (33,750 theoretical). For purposes of identification, this block polymer has a code designation of A.

Twenty parts of block polymer A was gradually added, with continuous stirring, to 80 parts of water. The temperature of the water was between 40 and 50° F. The block polymer A and water were stirred gently until all of the block polymer was dissolved. The solution was then allowed to warm to room temperature. A clear ringing gel was formed.

The procedure for making the gels described in Table I was essentially the same as illustrated in Example I.

TABLE I

| Mol. wt. of hydrophobe (average) | Weight percent of hydrophile (average) | Molecular weight of polymer | | Weight percent of polymer in gel |
|---|---|---|---|---|
| | | Theoretical | Average found | |
| 2,001–2,501 | 80 | 11,250 | 12,500 | 60 |
| | 80 | 11,250 | 12,500 | 70 |
| | 80 | 11,250 | 12,500 | 80 |
| 2,501–3,000 | 45 | 5,000 | 5,400 | 60 |
| | 45 | 5,000 | 5,400 | 70 |
| | 45 | 5,000 | 5,400 | 80 |
| | 75 | 11,000 | 12,000 | 50 |
| | 75 | 11,000 | 12,000 | 70 |
| | 75 | 11,000 | 12,000 | 90 |
| 3,501–4,000 | 45 | 6,830 | 7,500 | 40 |
| | 45 | 6,830 | 7,500 | 60 |
| | 45 | 6,830 | 7,500 | 80 |
| | 85 | 25,000 | 27,000 | 40 |
| | 85 | 25,000 | 27,000 | 60 |
| | 85 | 25,000 | 27,000 | 80 |
| 4,501–5,000 | 25 | 6,330 | 6,300 | 70 |
| | 35 | 7,300 | 7,200 | 50 |
| | 45 | 8,640 | 8,300 | 40 |
| | 45 | 8,640 | 8,300 | 50 |
| | 45 | 8,640 | 8,300 | 60 |
| | 45 | 8,640 | 8,300 | 70 |
| | 45 | 8,640 | 8,300 | 80 |
| | 45 | 8,640 | 8,300 | 90 |
| | 70 | 15,900 | 14,500 | 30 |
| | 70 | 15,900 | 14,500 | 40 |
| | 70 | 15,900 | 14,500 | 50 |
| | 70 | 15,900 | 14,500 | 60 |
| | 70 | 15,900 | 14,500 | 70 |
| | 70 | 15,900 | 14,500 | 80 |
| | 70 | 15,900 | 14,500 | 90 |
| 5,501–6,000 | 15 | 6,760 | 6,800 | 70 |
| | 15 | 6,760 | 6,800 | 80 |
| | 25 | 7,670 | 7,800 | 40 |
| | 25 | 7,670 | 7,800 | 50 |
| | 25 | 7,670 | 7,800 | 60 |
| | 25 | 7,670 | 7,800 | 70 |
| | 25 | 7,670 | 7,800 | 80 |
| | 25 | 7,670 | 7,800 | 90 |
| | 45 | 10,450 | 10,500 | 30 |
| | 45 | 10,450 | 10,500 | 60 |
| | 45 | 10,450 | 10,500 | 90 |
| | 70 | 19,200 | 18,600 | 30 |
| | 70 | 19,200 | 18,600 | 50 |
| | 70 | 19,200 | 18,600 | 70 |
| | 70 | 19,200 | 18,600 | 90 |
| 6,501–7,000 | 15 | 7,950 | 7,900 | 40 |
| | 15 | 7,950 | 7,900 | 60 |
| | 15 | 7,950 | 7,900 | 80 |
| | 25 | 9,000 | 9,000 | 40 |
| | 25 | 9,000 | 9,000 | 60 |
| | 25 | 9,000 | 9,000 | 90 |
| | 45 | 12,300 | 12,500 | 30 |
| | 45 | 12,300 | 12,500 | 50 |
| | 45 | 12,300 | 12,500 | 70 |
| | 45 | 12,300 | 12,500 | 90 |
| | 80 | 33,750 | 26,600 | 20 |
| | 80 | 33,750 | 26,600 | 40 |
| | 80 | 33,750 | 26,600 | 60 |
| | 80 | 33,750 | 26,600 | 80 |
| | 80 | 33,750 | 26,600 | 90 |
| | 90 | 67,500 | 37,400 | 20 |
| | 90 | 67,500 | 37,400 | 50 |
| | 90 | 67,500 | 37,400 | 70 |
| | 90 | 67,500 | 37,400 | 90 |
| 7,501–8,000 | 80 | 38,750 | 31,600 | 20 |
| | 80 | 38,750 | 31,600 | 50 |
| | 80 | 38,750 | 31,600 | 70 |
| | 80 | 38,750 | 31,600 | 90 |

EXAMPLE II

This example demonstrates that block polymers falling outside of the area ABC of the graph shown in the figure do not form gels regardless of the concentration of polymers were prepared and then dissolved in water as described in Example I. In every case, the solution did not form a gel. The polymers prepared and tested are described in Table II.

TABLE II

| Mol. wt. of hydrophobe (average) | Wt. percent of hydrophile (average) | Molecular weight of polymer | | Wt. percent of polymer in solution |
|---|---|---|---|---|
| | | Theoretical | Average found | |
| 1,501–2,000 | 45 | 3,200 | 3,400 | 50 |
| | 45 | 3,200 | 3,400 | 70 |
| | 45 | 3,200 | 3,400 | 90 |
| | 90 | 20,000 | 17,500 | 40 |
| | 90 | 20,000 | 17,500 | 60 |
| | 90 | 20,000 | 17,500 | 90 |

TABLE II—Continued

| Mol. wt. of hydrophobe (average) | Weight percent of hydrophile (average) | Molecular weight of polymer Theoretical | Molecular weight of polymer Average found | Weight percent of polymer insolution |
|---|---|---|---|---|
| 2,501–3,000 | 25 | 3,670 | 3,850 | 60 |
|  | 25 | 3,670 | 3,850 | 70 |
|  | 25 | 3,670 | 3,850 | 90 |
| 3,501–4,000 | 15 | 4,420 | 4,500 | 60 |
|  | 15 | 4,420 | 4,500 | 70 |
|  | 15 | 4,420 | 4,500 | 90 |
| 4,501–5,000 | 15 | 5,600 | 5,600 | 50 |
|  | 15 | 5,600 | 5,600 | 70 |
|  | 15 | 5,600 | 5,600 | 90 |
| 7,501–8,000 | 5 | 8,200 | 8,400 | 70 |
|  | 5 | 8,200 | 8,400 | 90 |

The following examples illustrate the preparation of various pharmaceutical and cosmetic compositions employing the gels of the present invention.

EXAMPLE III

A stable transparent ringing gel for use topically as a bactericide and fungicide was prepared by dissolving the block polymer of Example I, designated as polymer A, in cold water (5° C.–10° C.). Boric acid and a preservative were then added to the solution with mixing. The solution was allowed to warm to room temperature and a clear ringing gel formed. The gel had the following composition:

|  | Parts |
|---|---|
| Polymer A | 27.0 |
| Boric acid | 4.0 |
| Water | 69.0 |
| Preservative | Q.s. |

EXAMPLE IV

A sun screen cream was formulated from the following ingredients:

|  | Parts |
|---|---|
| Polymer A | 20 |
| Isopropyl alcohol | 18 |
| Amyl p-dimethylaminobenzoate | 1.5 |
| Water | 60.5 |
| Preservative | Q.s. |
| Perfume | Q.s. |

The cream was prepared by dissolving the amyl-p-dimethylaminobenzoate in isopropyl alcohol and then adding the alcoholic solution to a cool aqueous solution of Polymer A.

EXAMPLE V

In the manner described in the preceding example, various compositions were prepared. These compositions are as follows:

GERMICIDAL GEL

|  | Parts |
|---|---|
| Polymer A | 14 |
| Hexachlorophene | 3 |
| Isopropyl alcohol | 12 |
| Water | 71 |

INSECT REPELLENT

|  | Parts |
|---|---|
| Polymer A | 14 |
| Isopropyl alcohol | 12 |
| Meta-N,N-diethyltoluamide | 10 |
| Water | 64 |
| Preservative | Q.s. |

HAIR DRESSING GEL

|  | Parts |
|---|---|
| Polymer A | 20 |
| Propylene glycol | 3 |
| Lanolin | 1 |
| Free polypeptide acid (40%) | 8 |
| Sodium undecylenyl polypeptidate | 3 |
| Water | 65 |
| Perfume | Q.s. |
| Preservative | Q.s. |

HYDROALCOHOLIC HAIR GROOM GEL

|  | Parts |
|---|---|
| Polymer A | 20 |
| Oxypropylated oleic acid | 10 |
| Ethyl alcohol | 15 |
| Water | 55 |
| Preservative | Q.s. |

ANTISEPTIC GEL

|  | Parts |
|---|---|
| Polymer A | 26 |
| Propylene glycol | 2 |
| Diisobutylphenoxyethoxyethyl dimethyl benzyl ammonium chloride | 1 |
| Water | 71 |

THIOGLYCOLATE GEL

|  | Parts |
|---|---|
| Polymer A | 20 |
| Ammonium thioglycolate (60%) | 10 |
| Water | 70 |

ANTI-PERSPIRANT GEL

|  | Parts |
|---|---|
| Polymer A | 20 |
| Aluminum chlorohydrate (50%) | 38 |
| Oxyethylated oxypropylated $C_{12}$–$C_{18}$ straight chain alcohol | 1 |
| Perfume | 0.4 |
| Water | 40.6 |

EXAMPLE VI

A stable transparent hair waving gel was prepared from the following ingredients:

|  | Parts |
|---|---|
| Polymer B | 30 |
| Ammonium thioglycolate (60%) | 10 |
| Water | 59 |
| Ammonium hydroxide | 1 |

Polymer B is a block polymer of Formula I above having an average molecular weight base of 4750 and a hydrophile constituting about 70% by weight of the polymer. Average found molecular weight of the polymer is about 14,500 (15,900 theoretical).

EXAMPLE VII

An insect repellent gel was prepared from the following ingredients:

|  | Parts |
|---|---|
| Polymer C | 29 |
| Meta-N,N′-diethyltoluamide | 11 |
| Isopropyl alcohol | 5 |
| Water | 55 |

Polymer C is a block polymer of Formula I above having an average molecular weight base of 5750 and a hydrophile constituting about 40% by weight of the polymer. Amerage found molecular weight of the polymer is about 10,500 (9600 theoretical).

What is claimed is:

1. A gel consisting essentially of from about 80% to 10% by weight of water and from about 20% to 90% by weight of a polymer having the formula

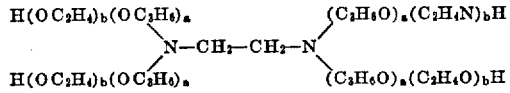

wherein $a$ and $b$ are integers such that the molecular weight of the hydrophobe portion of the polymer and the weight percent of the hydrophile portion of the polymer fall within the area ABC of the graph shown in the figure.

2. The gel of claim 1 when the polymer has an average hydrophobe molecular weight of between 4500 and 7000.

3. The gel of claim 1 when the hydrophile portion of the polymer constitutes from 40 to 90 weight percent of the polymer.

4. The gel of claim 1 when the polymer has an average hydrophobe molecular weight of between 4500 and 7000 and the hydrophile portion constitutes from 40 to 90 weight percent of the polymer.

5. The gel of claim 1 when the polymer comprises from about 20% to 50% by weight of the gel.

6. A process of preparing a gel from a polymer of the formula

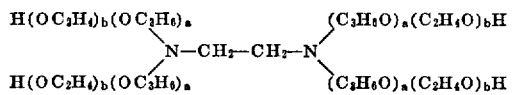

wherein $a$ and $b$ are integers such that the molecular weight of the hydrophobe portion of the polymer and the weight percent of the hydrophile portion of the polymer fall within the area ABC of the graph shown in the figure, comprising the steps of (a) dissolving from about 20 to 90 weight percent of said polymer, based on total weight of said gel, in water at a temperature between 35° F. and 50° F. to form a solution, and (b) warming said solution up to about 70° to 80° F., whereby a clear ringing gel is formed.

References Cited
UNITED STATES PATENTS
2,979,528    4/1961    Lundsted _____ _____ 260—584

RICHARD D. LOVERING, Primary Examiner

U.S. Cl. X.R.

424—60, 68, 71, 72, 148, 324, 329, 353